United States Patent [19]

Mathur

[11] Patent Number: 5,218,440
[45] Date of Patent: Jun. 8, 1993

[54] SWITCHED RESISTIVE NEURAL NETWORK FOR SENSOR FUSION

[75] Inventor: Bimal P. Mathur, Thousand Oaks, Calif.

[73] Assignee: Rockwell International Corporation, Seal Beach, Calif.

[21] Appl. No.: 712,240

[22] Filed: Jun. 7, 1991

[51] Int. Cl.[5] .............................................. G06F 15/18
[52] U.S. Cl. ................................ 358/213.27; 395/24; 395/22; 382/14; 358/213.15
[58] Field of Search ...................... 395/22, 24; 382/14, 382/15; 358/213.27, 213.15

[56] References Cited

U.S. PATENT DOCUMENTS

| | | | |
|---|---|---|---|
| 5,058,049 | 10/1991 | Anderson | 364/826 |
| 5,062,000 | 10/1991 | Harris et al. | 364/574 |
| 5,086,219 | 2/1992 | Koch et al. | 250/208.2 |

OTHER PUBLICATIONS

J. Hutchinson, C. Koch, J. Luo, and C. Mead, "Computing Motion Using Analog and Binary Resistive Networks," Computer, vol. 21, No. 3, pp. 52–63, Mar. 1988.
M. Maher, S. DeWeerth, M. Mahoward, and C. Mead, "Implementing Neural Architectures Using Analog VLSI Circuits," IEEE Trans. on Circuits and Systems, vol. 36, No. 5, pp. 643–652, May 1989.
S. Geman and D. Geman, "Stochastic Relaxation, Gibbs Distributions, and the Bayesian Restoration of Images," IEEE Trans. Pattern Anal. Machine Intell., PAMI-5, pp. 721–741, 1984.
C. Koch, J. Marroquin, and A. Yuille, "Analog 'neuronal' Networks in Early Vision," Proc. Natl. Acad. Sci. USA, vol. 83, pp. 4263–4267, Jun. 1986.
T. Poggio, E. Gamble, and J. Little, "Parallel Integration of Vision Modules," Science, vol. 242, pp. 436–439, Oct. 21, 1988.
H. Bülthoff, J. Little, and T. Poggio, "A parallel algorithm for real-time computation of optical flow," Nature, vol. 337, pp. 549–553, Feb. 9, 1989.
J. Harris, C. Koch, J. Luo, "A Two-Dimensional Analog VLSI Circuit for Detecting Discontinuities in Early Vision", Science, vol. 248, pp. 1209–1211, Jun. 8, 1990.

Primary Examiner—Allen R. MacDonald
Attorney, Agent, or Firm—John C. McFarren

[57] ABSTRACT

An electronic image processing system uses data provided by one or more sensors to perform cooperative computations and improve image recognition performance. A smoothing resistive network, which may comprise an integrated circuit chip, has switching elements connected to each node. The system uses a first sensory output comprising primitives, such as discontinuities or object boundaries, detected by at least a first sensor to define a region for smoothing of a second sensory output comprising at least a second, distinct output of the first sensor or a distinct output of at least a second sensor. A bit pattern for controlling the switches is generated from the detected image discontinuities in the first sensory output. The second sensory output is applied to the resistive network for data smoothing. The switches turned off by the data from the first sensory output define regional boundaries for smoothing of the data provided by the second sensory output. Smoothing operations based on this sensor fusion can proceed without spreading object characteristics beyond the object boundaries.

14 Claims, 1 Drawing Sheet

SWITCHED RESISTIVE NEURAL NETWORK FOR SENSOR FUSION

TECHNICAL FIELD

The present invention relates to electronic sensing systems and, in particular, to an image detection system having an analog neural network for fusing different sensory descriptions of an object field.

BACKGROUND OF THE INVENTION

Pixel level image processing systems generally must rely on noisy sensor data to extract spatial features of detected images. Unfortunately, the extraction of spatial features usually requires operations that tend to amplify high frequency noise. A commonly used technique for minimizing noise is the process of image smoothing performed before any spatial operations. Image smoothing, however, can cause the object characteristics of the image to spread beyond the actual object boundaries, thus blurring or distorting the image. As a result, image smoothing often yields poor performance in recognition and classification of detected images.

One method of improving the results of image smoothing is to identify image discontinuities detected by the sensor and use the discontinuities as boundaries for the image smoothing operations. This approach has been used in the prior art for computations in early vision modules. Image edges have been used, for example, to establish boundaries for depth or motion computations.

It is believed that human vision relies on neural parallel processing of generally noisy and ambiguous information from each of a multiplicity of sensors. Normal human visual perception, however, is neither noisy nor ambiguous. This result is believed to be achieved by a neural process of fusing the different descriptions, such as edge and depth information, from one or more sensors. Emulation of this process is being investigated for improving image recognition performance of electronic image processing systems.

SUMMARY OF THE INVENTION

The present invention comprises an electronic processing system that performs cooperative computations using data provided by one or more sensors. A primary object of the invention is to improve the image recognition performance of electronic image processing systems.

The present invention combines, or fuses, the output of one or more sensors to produce an unambiguous output image. Typically, the system uses primitives, such as discontinuities or object boundaries, detected by a first sensor to define a bounded region for smoothing an output of a second sensor or a different output from the first sensor. For example, depth discontinuities detected by a laser radar can be used to define image boundaries for smoothing the output of a coboresighted infrared focal plane array (IRFPA).

A primary feature of the invention is a smoothing resistive network that has switching elements connected to each node. In a preferred embodiment, the invention comprises a smoothing resistive network in the form of an integrated circuit chip. The switching elements for each node can be operated by loading a suitable bit pattern. The bit pattern for controlling the switches, and thereby defining a bounded region in the resistive network, can be generated from image discontinuities obtained from the output of the first sensor. The output of the second sensor (or a distinct output from the first sensor) can be applied to the resistive network for data smoothing within the bounded region. Thus, the network switches turned off by data from the first sensor define or map the regional boundaries for smoothing of data provided by the second sensor. An advantage of the invention is that smoothing operations based on sensor fusion can proceed without spreading object characteristics of the image beyond the actual object boundaries.

BRIEF DESCRIPTION OF THE DRAWINGS

For a more complete understanding of the present invention and for further advantages thereof, the following Detailed Description of the Preferred Embodiments makes reference to the accompanying Drawings, in which.

DETAILED DESCRIPTION OF THE PREFERRED EMBODIMENTS

Figure 1:
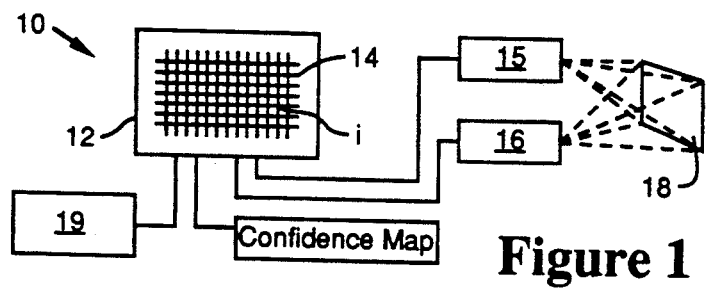
FIG. 1 is a block diagram of a multisensor electronic processing system of the present invention.

The electronic processing system 10 of the present invention is illustrated in the block diagram of FIG. 1. System 10 comprises a processor 12 that includes an M×N smoothing resistive network 14 comprising a plurality of nodes, such as node i. In the preferred embodiment, network 14 is formed as an integrated circuit chip, such as a 28×36 node CMOS chip that has been fabricated to perform the function of network 14. Although illustrated as a rectangular grid, network 14 may be formed in other geometric layouts, such as a hexagonal grid, for example. In a hexagonal grid, each node would have three resistors and associated switches extending in a plane radially outward from the node at an angle of 120° from each other. System 10 generally includes multiple sensors, such as sensors 15 and 16, connected to processor 12. In the alternative, a single sensor having separate and distinct sensory outputs may be used. Sensors 15 and 16 may comprise different types of sensors but are coboresighted on the same object field 18. System 10 may also include means for generating a "confidence map," from the input of one or more of the sensors, for use in the image smoothing process performed by processor 12. Sensors used to generate the confidence map must provide data about object field 18, but they are not required to be co-boresighted. Processor 12 fuses the output of the multiple sensors (or the distinct outputs of a single sensor) and provides the fused output to a pattern recognition system or video display device 19.

Figure 2:
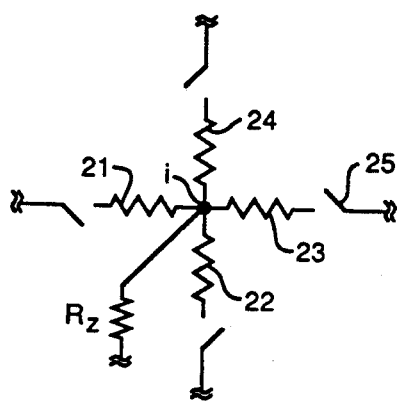
FIG. 2 is a simplified schematic diagram illustrating a two-dimensional rectangular array of resistors and switches connected to a node of a smoothing resistive network of the present invention.
Figure 3:
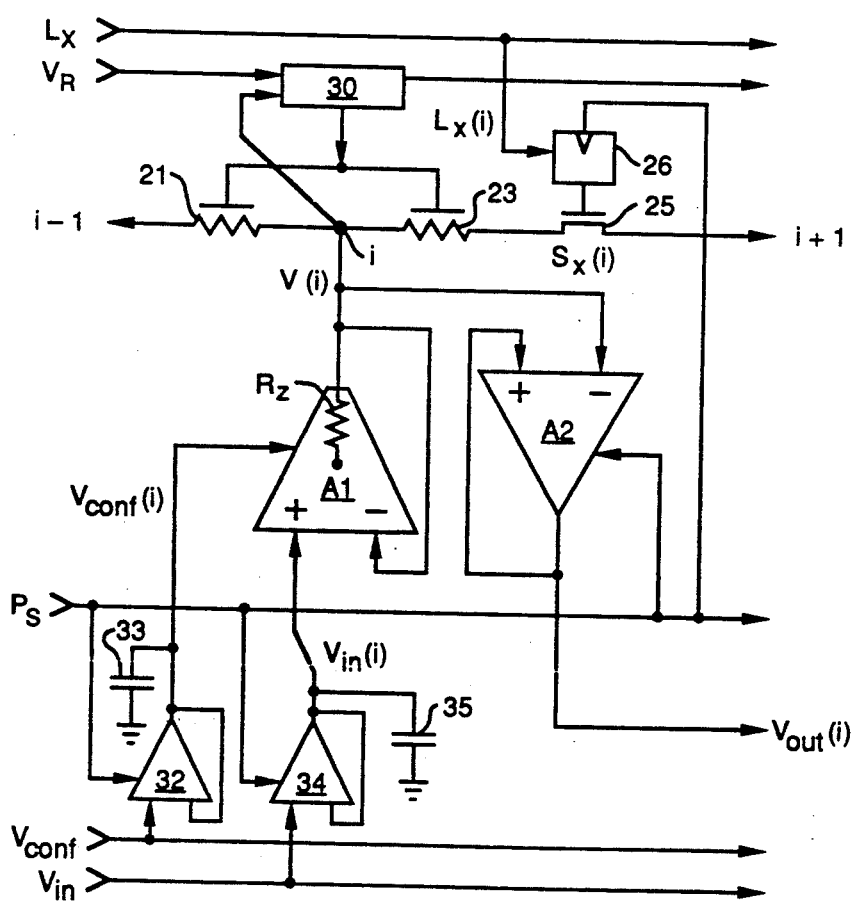
FIG. 3 is a schematic diagram illustrating the circuitry for a resistor and its associated switch in a single dimension of the resistive network node illustrated in FIG. 2.

FIG. 2 is a simplified schematic diagram of node i of two-dimensional network 14, and FIG. 3 is a more detailed schematic diagram for a single dimension of node i. To aid in understanding, the same reference numerals are used to identify the same or similar components illustrated in FIGS. 2 and 3. Node i is connected to other nodes of network 14 by resistors and switches. As shown in FIG. 2, network 14 may be visualized as an array of resistors in the x-y plane with an input to each node through $R_z$ in the z-axis. Resistors 21 and 23 comprise the x-axis resistive component of node i (i.e., $R_x(i)$), and resistors 22 and 24 comprise the y-axis resistive component of node i (i.e., $R_y(i)$). Generally, resistors 21-24 provide a nonlinear response. Each resistor has a switch, such as switch 25 associated with resistor 23, connected in electrical series to join node i to neighboring nodes of network 14. In this example of the invention having two sensors, data from sensor 15 is used to set the switches (i.e., ON=closed, or OFF=open), and data from sensor 16 is smoothed by resistive network 14 within the boundaries of the network determined by the settings of the switches.

The detection of discontinuities requires the use of spatial differentiation, which is a noisy process. Typically, image smoothing is required to reduce this noise. A major drawback of prior image processing systems that rely on smoothing (or other statistical techniques) to reduce noise and supply missing data is that they produce blurred, smeared, or distorted image boundaries. The present invention addresses this problem by fusing pixel level data from distinctly different descriptions or maps of field 18. Discontinuities, such as edges and corners, detected from the intensity distribution in one map be used to define regions for smoothing data, such as surface profiles or motion fields, from another map. As a practical example, primary sensor 15 can be a laser radar that defines boundaries of an object in field 18 and secondary sensor 16 can be an infrared focal plane array (IRFPA) that provides a spatial heat distribution over field 18. Network 14 performs an image smoothing operation on the data provided by the IRFPA for noise reduction and spreading of the IR image within boundaries established by the data from the laser radar.

The principles of the present invention extend to the use of multiple sensors with various algorithms for fusion of the data. For example, a "cooperative scene segmentation" algorithm can fuse strong discontinuities found by any sensor with coincident weak discontinuities found by any other sensor. This algorithm can improve image definition by providing more accurate and complete boundary information for use with image smoothing. In one embodiment of the invention, processor 12 can include a low power VLSI circuit for performing the sensor fusion algorithm as well as a learning algorithm for registration of the multiple sensors.

Mathematical models of early vision processes are known in the art and generally cast as energy minimization problems. The present invention builds on this foundation because energy minimization problems are easily mapped to analog VLSI circuits. The basic assumption of these models is that physical objects generally occupy a continuous region in space and their observable properties tend to be continuous functions over the extent of the objects. This basis for performing smoothing operations gets translated into constraints on estimates of a physical quantity S (e.g., surface profile) of an object derived from measured range data (d). The energy function is:

$$E = (S-d)^2 + R(d^2S/dx^2)^2$$

where R is a constant called a "regularizer." This energy function, depending on the value of R, establishes a balance between consistency with the measured data and the degree of smoothness desired. The order of the derivative specifies the smoothness, which depends on the nature of the data (d) and the type of information that must be derived. To minimize E by using a network requires that $dE/dt < 0$. This condition gives rise to a network equation in which the quantity S is identified as the node voltage. In the present invention, network 14 has been simplified to a node interconnection pattern limited to nearest neighbors. In this case, each discontinuity is realized as a switch in series with a smoothing resistor.

FIG. 3 is a schematic diagram illustrating one dimension of the two-dimensional grid of FIG. 2, showing the components of node i in the x-z plane. The x-z plane. The y-axis resistors 22 and 24 and associated switches connected to node i are similar to the x-axis components but are omitted from FIG. 3 to clarify the function of the circuit. As illustrated in FIG. 3, resistors 21 and 23, which are part of the x-axis of the resistive grid forming network 14, may comprise MOSFETs biased in the subthreshold region by a bias circuit 30 having an external voltage $V_R$ and the node voltage $V(i)$ as inputs. Each resistor in the grid, such as resistor 23, has a corresponding switch, such as switch 25 (i.e., $S_x(i)$), connected in electrical series. Each switch is set by loading a bit into a corresponding latch, such as latch 26 connected to switch 25. In the present invention, a bit pattern generated from discontinuities detected by primary sensor 15 is loaded into the latches of network 14. The bit for latch 26 (i.e., $L_x(i)$) is input on global line $L_x$.

Each node i is connected to an operational amplifier A1 and an output amplifier A2. Opamp A1, which is biased by a node confidence voltage $V_{conf}(i)$ loaded on a capacitor 33 by a switched opamp 32, has a finite output resistance $R_z$. Data from secondary sensor 16 is supplied, as $V_{in}(i)$ from switched opamp 34 and input capacitor 35, through opamp A1 to node i of smoothing resistive network 14. Resistance $R_z$ can be controlled on a node-by-node basis by $V_{conf}(i)$ corresponding to the pixel-by-pixel confidence map generated by processor 12 from the input of one or more of the sensors. The spatial extent of the smoothing operation within network 14 is controlled by the ratio of the node resistance $R_x(i)$ or $R_y(i)$ to the input resistance $R_z$. The output amplifier A2 connected to node i provides a node output voltage $V_{out}(i)$. The output voltages $V_{out}(i)$ from all the nodes, which are provided to output device 19, comprise the readout of the processed version of the image detected by sensors 15 and 16. In actual practice, a 4.5×6.7 mm semiconductor chip comprising network 14 has been fabricated using a 2 µm CMOS process. The chip contains a 28×36 array of the circuit illustrated in FIG. 3.

In the preferred embodiment of the present invention, the input data for each node i, which includes image data $V_{in}(i)$ and latch state $L_x(i)$, is scanned into network 14 line-by-line. Network 14 accepts analog sensor data on line $V_{in}$ and switch setting data on separate line $L_x$. A pixel select line $P_S$ is used to select opamps 32 and 34 and latch 26 for storing analog confidence data on capacitor 33, analog image data on input capacitor 35, and the state of switch 25 on latch 26. Although only one pixel select line $P_S$ illustrated in FIG. 3, system 10 may include two pixel select lines for independent input and output operations.

Although the present invention has been described with respect to specific embodiments thereof, various changes and modifications can be carried out by those skilled in the art without departing from the scope of the invention. Therefore, it is intended that the present invention encompass such changes and modifications as fall within the scope of the appended claims.

I claim:

1. An electronic processing system, comprising:
   a processor having a resistive network, said network comprising a plurality of nodes;
   each of said nodes connected to a neighboring node by a resistive component and a switch connected in electrical series;
   at least one sensor connected to said network;
   a first output of said at least one sensor directed to said nodes to control said switches and thereby set boundaries within said network; and
   a second output of said at least one sensor directed to said nodes for resistive smoothing within said boundaries of said network set by said switches.

2. The system of claim 1, further comprising output means connected to said processor for providing a bounded, smoothed data output.

3. The system of claim 2, wherein said first output comprises data corresponding to discontinuities detected by said at least one sensor.

4. The system of claim 2, further comprising a plurality of latches, each of said latches connected to a corresponding one of said switches, said latches receiving said discontinuity data for setting said switches.

5. The system of claim 4, wherein said output means further comprises a plurality of output amplifiers, each of said output amplifiers connected to one of said plurality of nodes.

6. The system of claim 2, further comprising:
   a first sensor for providing said first output;
   a second sensor for providing said second output; and
   said first and second sensors co-boresighted on a common field.

7. An electronic image processing system, comprising:
   a processor having a resistive network, said network comprising a plurality of nodes;
   each of said nodes connected to a neighboring node by a resistive component and a switch connected in electrical series;
   one or more sensors connected to said network, said one or more sensors generating at least two distinct sensor images of an object field;
   at least a first of said sensor images directed to said nodes to set said switches, said switch settings forming boundaries within said network corresponding to discontinuities detected in said at least a first of said sensor images;
   at least a second of said sensor images directed to said nodes for resistive image smoothing within said boundaries of said network set by said switches; and
   output means connected to said processor for providing a bounded, smoothed output image.

8. The system of claim 7, further comprising a plurality of latches for receiving said at least a first of said sensor images and setting said switches, each of said latches connected to a corresponding one of said switches.

9. The system of claim 8, wherein said output means further comprises a plurality of output amplifiers, each of said output amplifiers connected to a corresponding one of said plurality of nodes.

10. The system of claim 9, further comprising:
    a first sensor for providing said first sensor image;
    a second sensor for providing said second sensor image; and
    said first and second sensors co-boresighted on said object field.

11. A method of electronic image processing, comprising the steps of:
    providing a processor with a resistive network having a plurality of nodes;
    connecting each of said nodes to a neighboring node with a resistive component and a switch in electrical series;
    connecting at least one sensor to said network;
    generating a plurality of sensor images of an object field;
    detecting discontinuities in at least a first of said sensor images;
    directing data representing said detected discontinuities to said nodes for setting said switches;
    forming boundaries within said network, said boundaries defined by said switch settings corresponding to said detected discontinuities;
    directing data representing at least a second of said sensor images to said nodes for resistive image smoothing within said boundaries formed in said network; and
    providing a bounded, smoothed output image.

12. The method of claim 11, wherein the step of setting said switches further comprises the step of directing data representing said detected discontinuities to a plurality of latches, each of said latches connected to a corresponding one of said switches.

13. The method of claim 12, wherein the step of providing said bounded, smoothed output image further comprises the step of connecting each of a plurality of output amplifiers to a corresponding one of said plurality of nodes.

14. The method of claim 13, further comprising the steps of:
    connecting a plurality of sensors to said network for generating said plurality of sensor images; and
    co-boresighting said plurality of sensors on said object field.

* * * * *